US007222047B2

(12) United States Patent
McMillan et al.

(10) Patent No.: US 7,222,047 B2
(45) Date of Patent: May 22, 2007

(54) SYSTEM AND METHOD FOR MONITORING AND CONTROLLING AN AQUATIC ENVIRONMENT

(75) Inventors: Andrew H. McMillan, Manchester, NH (US); Richard M. Desmarais, Manchester, NH (US)

(73) Assignee: Teletrol Systems, Inc., Manchester, NH (US)

( * ) Notice: Subject to any disclaimer, the term of this patent is extended or adjusted under 35 U.S.C. 154(b) by 0 days.

(21) Appl. No.: 11/014,279

(22) Filed: Dec. 16, 2004

(65) Prior Publication Data

US 2005/0172910 A1 Aug. 11, 2005

Related U.S. Application Data

(60) Provisional application No. 60/531,316, filed on Dec. 19, 2003.

(51) Int. Cl.
*B01D 17/12* (2006.01)
(52) U.S. Cl. .................. 702/182; 210/85; 210/169; 210/805; 119/238
(58) Field of Classification Search .............. 702/182; 210/851, 169, 805; 119/51.02, 51.04, 51.11, 119/219, 226, 238
See application file for complete search history.

(56) References Cited

U.S. PATENT DOCUMENTS

| 3,688,744 | A | * | 9/1972 | Kaplan | 119/51.11 |
|---|---|---|---|---|---|
| 4,626,992 | A | | 12/1986 | Greaves et al. | 364/418 |
| 5,046,451 | A | | 9/1991 | Inslee et al. | 119/3 |
| 5,119,764 | A | * | 6/1992 | Tum | 119/51.04 |
| 5,353,745 | A | | 10/1994 | Fahs, II | 119/226 |
| 6,038,494 | A | * | 3/2000 | Fisher et al. | 700/287 |
| 6,119,630 | A | * | 9/2000 | Lobsiger et al. | 119/238 |
| 6,171,480 | B1 | * | 1/2001 | Lee et al. | 210/85 |
| 6,357,389 | B1 | * | 3/2002 | March et al. | 119/219 |
| 6,393,899 | B1 | * | 5/2002 | Shedd et al. | 73/61.41 |
| 6,573,085 | B2 | * | 6/2003 | Lucido et al. | 435/253.6 |
| 6,755,981 | B2 | * | 6/2004 | Terato | 210/805 |
| 6,811,113 | B1 | * | 11/2004 | Silansky et al. | 244/30 |
| 2003/0075642 | A1 | * | 4/2003 | Silansky et al. | 244/30 |
| 2005/0103930 | A1 | * | 5/2005 | Silansky et al. | 244/30 |
| 2005/0172910 | A1 | * | 8/2005 | McMillan et al. | 119/226 |
| 2005/0218053 | A1 | * | 10/2005 | Getsinger | 210/169 |
| 2005/0230527 | A1 | * | 10/2005 | Silansky et al. | 244/30 |
| 2005/0257748 | A1 | * | 11/2005 | Kriesel et al. | 119/51.02 |
| 2006/0011144 | A1 | * | 1/2006 | Kates | 119/719 |

FOREIGN PATENT DOCUMENTS

| DE | 199 61 142 | | 7/2000 |
|---|---|---|---|
| JP | 06125678 | A * | 5/1994 |
| JP | 2004001909 | A * | 1/2004 |
| WO | WO 97 49279 | | 12/1997 |

* cited by examiner

*Primary Examiner*—Carol S. W. Tsai
(74) *Attorney, Agent, or Firm*—Bromberg & Sunstein LLP

(57) ABSTRACT

A system and method for monitoring and controlling an aquatic environment thus regulating the aquatic environment and maximizing the stability of the aquatic ecosystem. This system uses sensor and data fusion algorithms to perform system anomaly analysis and predictive failure diagnostics based on the output of sensors associated with the aquatic environment control devices. Based on the system anomaly analysis and/or predictive failure diagnostics, the system may continuously adjust the system parameters to maintain an efficient and stable aquatic environment, alert local or remote monitors of failed or impending failure of control devices. In addition, the system may present the system anomaly analysis and predictive failure diagnostics information at a local or remote location to enable the monitor to address any problems presented in situ.

12 Claims, 14 Drawing Sheets

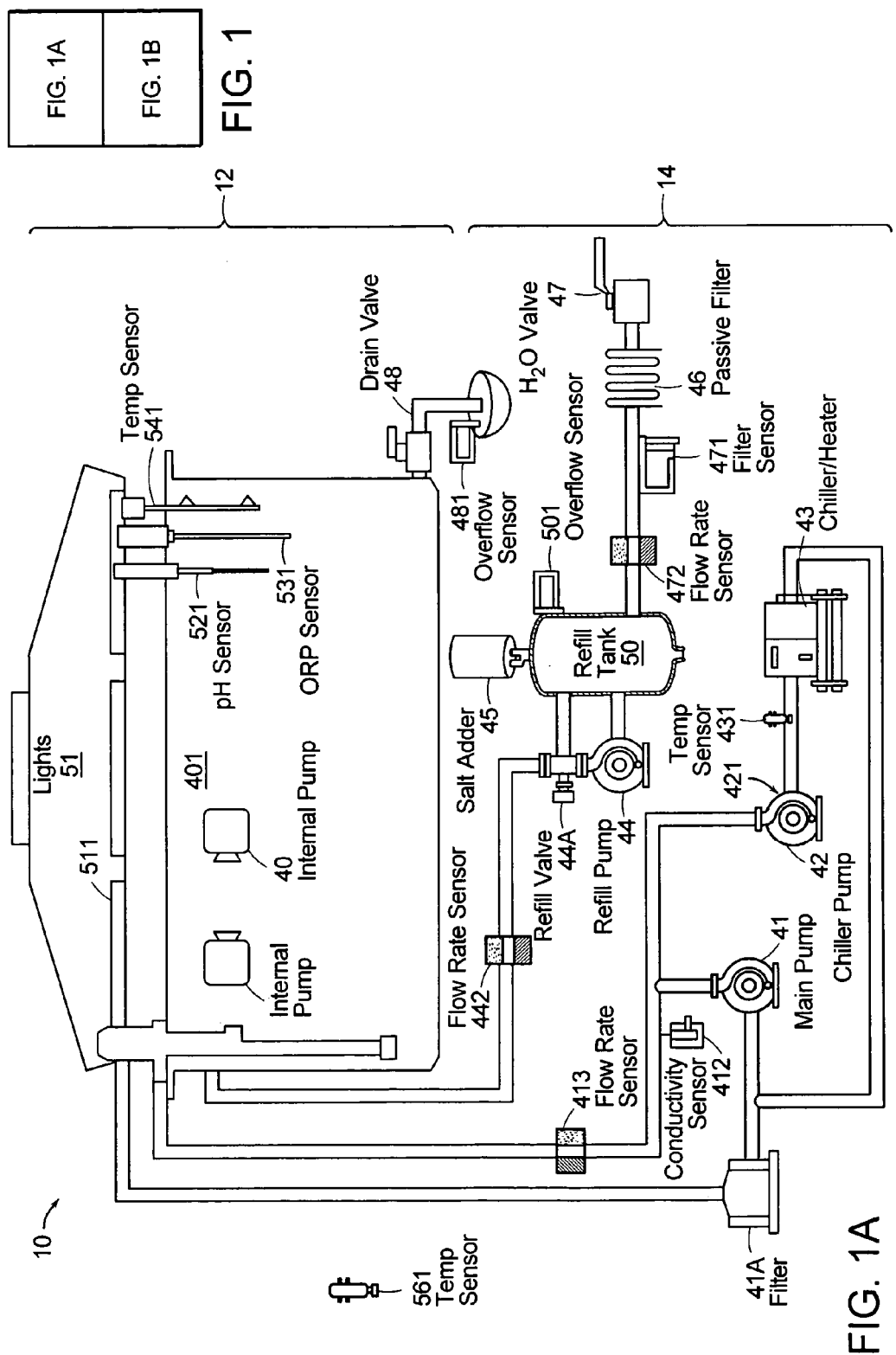

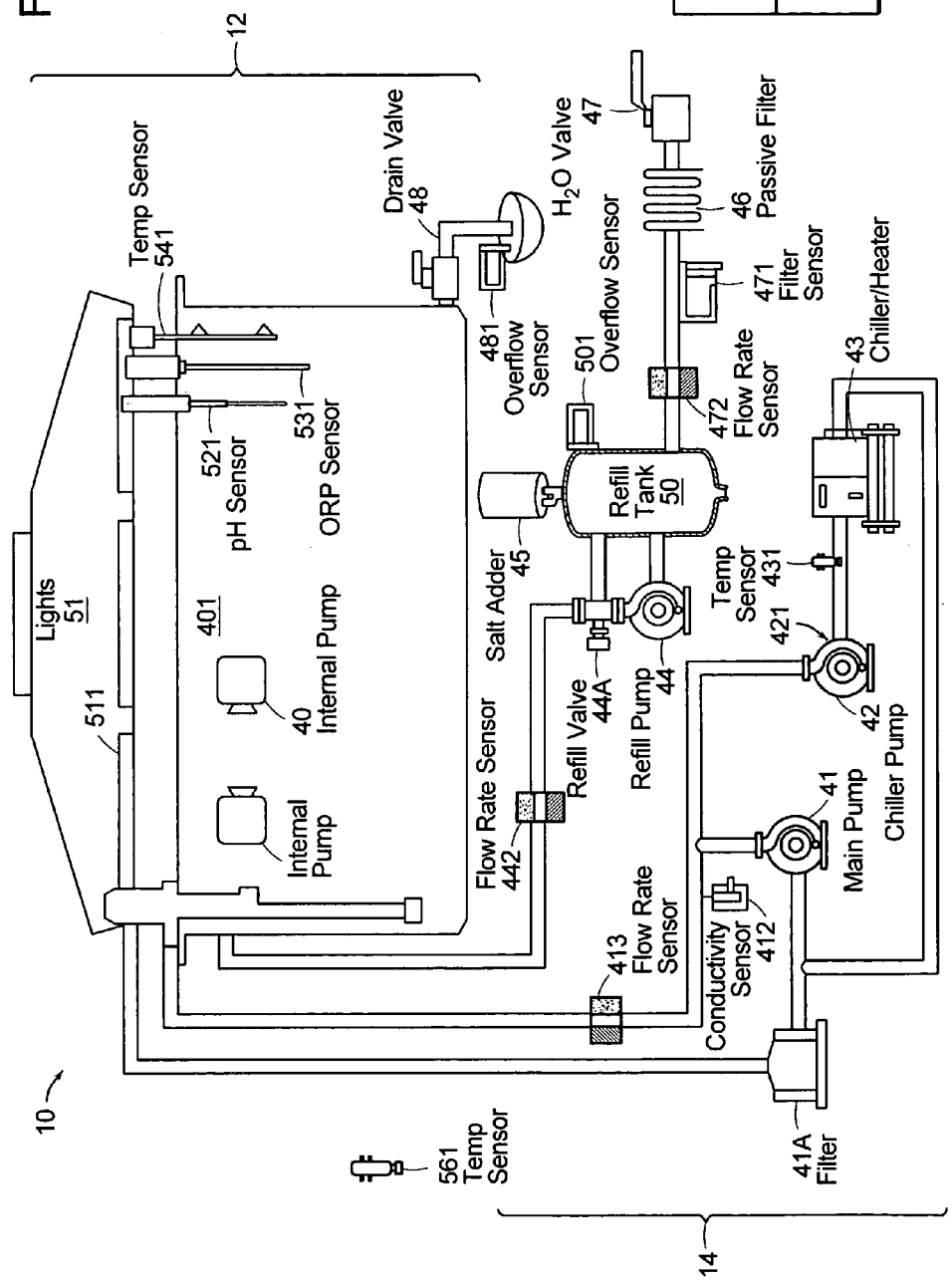

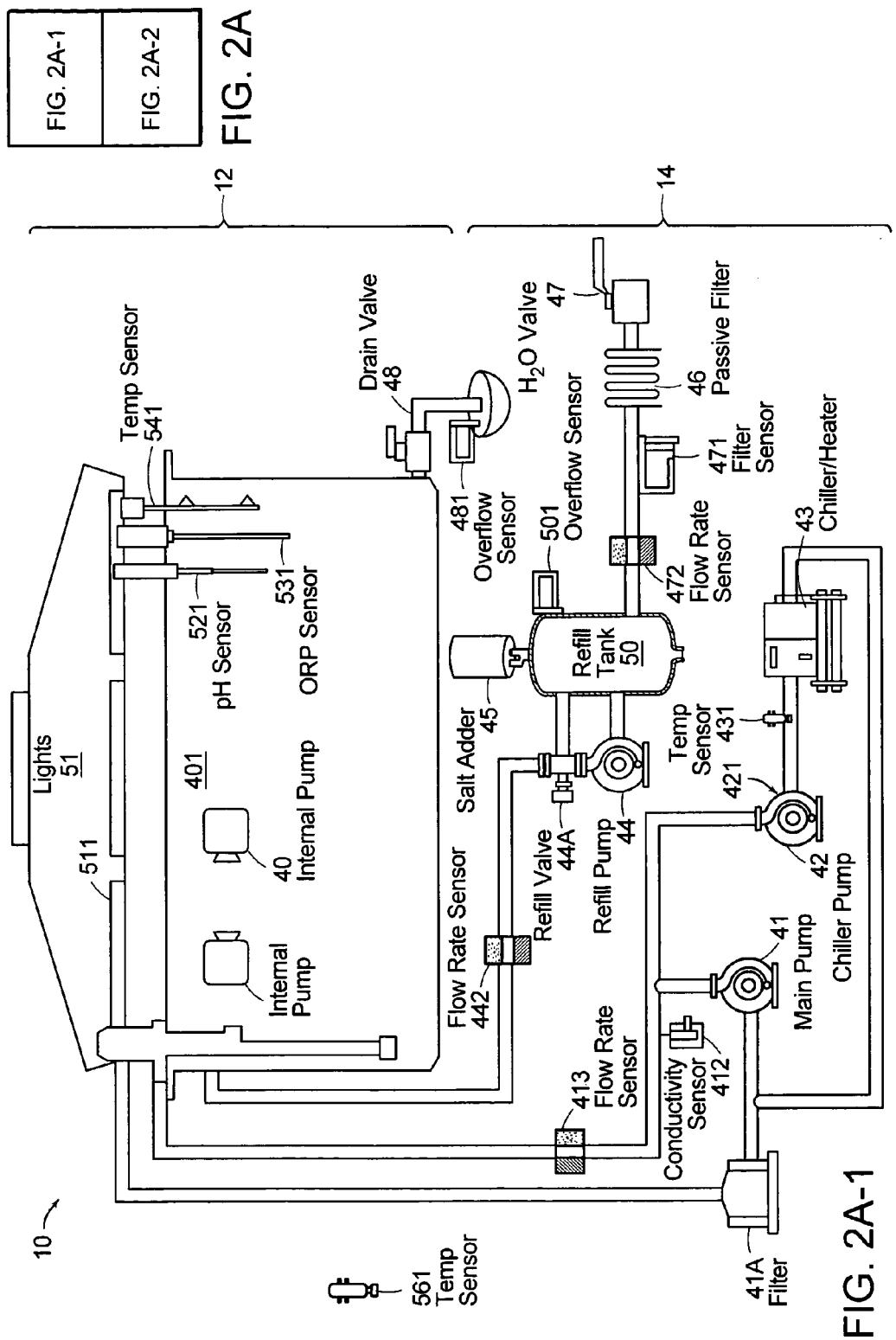

Performance Curve

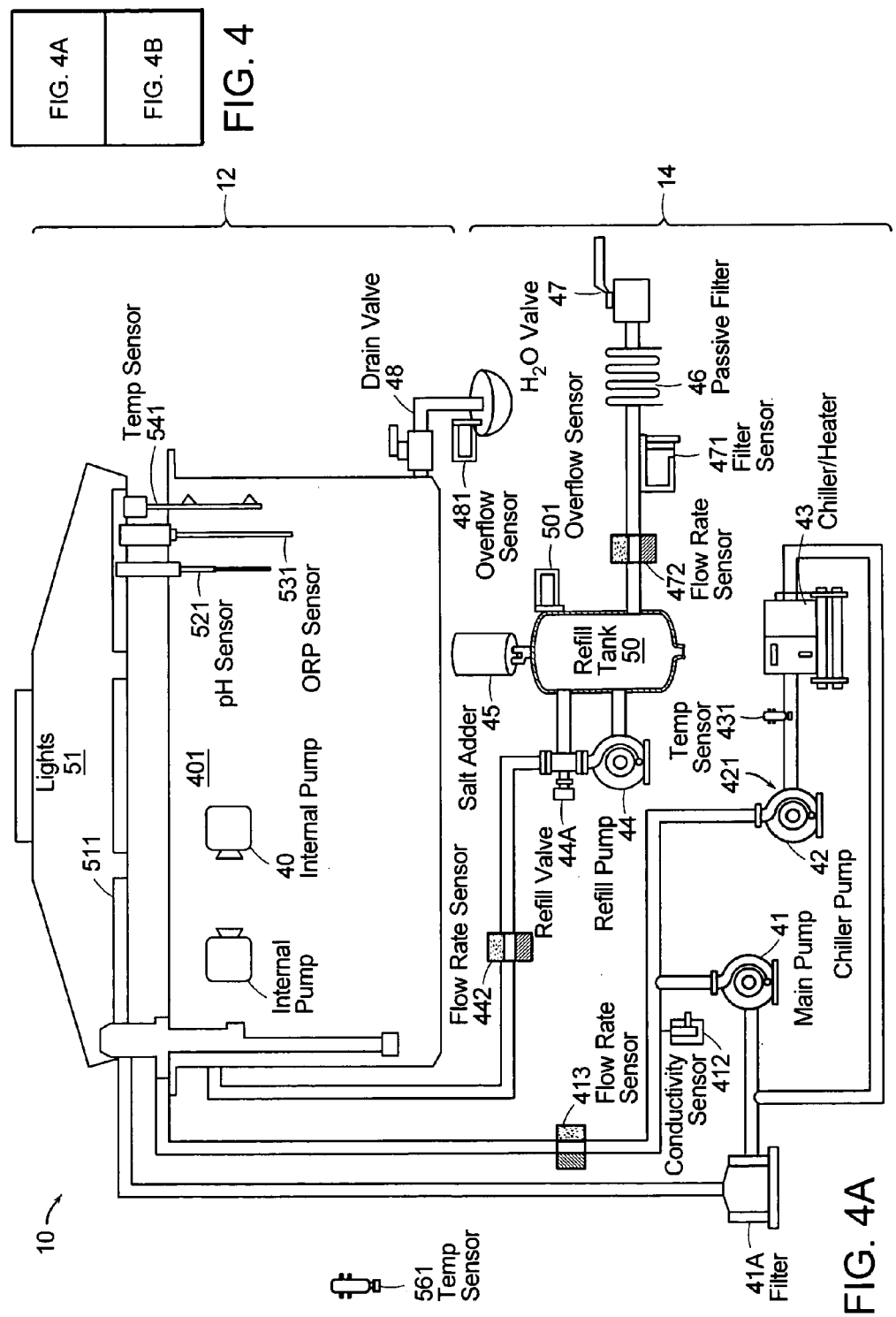

SYSTEM AND METHOD FOR MONITORING AND CONTROLLING AN AQUATIC ENVIRONMENT

CROSS REFERENCE TO RELATED APPLICATION

This application claims priority from U.S. Provisional Application, Ser. No. 60/531,316 filed Dec. 19, 2003, which is incorporated herein by reference.

TECHNICAL FIELD

The present invention relates to apparatus, processes and systems for monitoring and controlling aquatic environments including analyzing and predicting an anomaly in an aquatic environment.

BACKGROUND

Aquariums or aqua systems have been maintained since antiquity. These aqua systems range from the professional and industrial types used in places like the New England Aquarium, to mid-size ones in professional buildings, restaurants, pet shops or homes, to the small bookshelf ones in most children's rooms. Generally, most aqua systems have two components: an enclosure housing the organism (s) or inhabitants of the aqua system and the machinery maintaining the enclosure environment. The enclosure can be simple or sophisticated with other built-in enclosures for coral beds and/or other flora and fauna. The machinery maintaining the enclosure environment, generally, includes components such as, a pump, a filter, a light source, and a timer to regulate the light. The machinery of sophisticated and automated aqua systems generally has more components such as chillers, heaters, secondary and internal pumps, fish feeders and water replenishment devices, to maintain the aquatic environment.

Some monitoring systems for aqua systems are known in the art. Traditionally, such monitoring systems evaluate end parameters such as the water temperature and pH of the aqua system. When in operation, such monitoring systems typically sound an alert when a stated end parameter exceeds a programmed threshold. Generally, in response to the alert, service personnel must quickly remedy the situation to prevent further deviation from the appropriate parameter threshold value. While such traditional monitoring systems are adequate for certain aqua system applications, monitoring, control and system analysis of intermediate control devices, coupled with prompt alert and response to the alert, can be difficult due to factors such as cost of sensors for intermediate control devices, location of the service personnel, response of the service personnel and the nature of the reported problem.

Another shortcoming of such traditional systems is that it is often difficult to use real-time monitoring and dynamic control of the intermediate control devices because, outside a limited range of operating conditions, the intermediate device itself may contribute to deviation in end parameters. For example, the traditional aqua systems usually use unmonitored or uncontrolled intermediate control devices. Because these control devices are integrated to other control devices, and thus contribute to the monitored end parameters, there is a need to monitor these intermediate control devices to better detect impending deviations of the end parameter. Furthermore, since the intermediate control devices are usually integrated, there is the need to monitor and control them, thus an isolated failure of an individual intermediate control device should not be allowed to cascade throughout the aquatic environment with probable consequences to the overall aquatic ecosystem. Monitoring the intermediate control devices may produces outputs that may be used in other system-wide applications and analysis.

Lastly, many traditional monitoring systems, such as those described above, are constrained to simple aqua systems maintenance tasks such as monitoring the water temperature and pH. Such traditional systems are not well suited for monitoring and controlling sophisticated and automated systems that require extensive system analysis, system anomaly analysis, and predictive failure diagnostics. Examples of extensive system anomaly analysis include but may not be limited to complex tasks such as automatic water replenishment, water circulation, and detection of opacity in reduction of the viewing glass or plastic. Examples of predictive failure diagnostics include monitoring and controlling early warning detection systems, measuring flow rates from system drain valves, alerting the owners to possible failures before such failures are detrimental to the aqua system and sending real-time recorded acoustic profile of the aquatic environment to a remote monitoring terminal to diagnose a potential problem.

While the traditional monitoring and controlling systems for aqua systems represent, in some instances, useful tools in this field, there remains a need in the art to: (1) provide cost effective, improved extensive system monitoring and controlling capabilities; (2) provide improved system monitoring and alert systems by monitoring the intermediate control devices for likely failures; (3) provide for continuously adjusting system parameters to compensate for the dynamic aquatic environment conditions based on the system analysis; (4) provide predictive failure diagnostics to alert users of possible failures before such failures occur; and (5) provide for continuously adjusting system parameters to compensate for the dynamic aquatic environment conditions based on the predictive failure diagnostics.

SUMMARY OF THE INVENTION

Accordingly, the present invention is directed to a real-time dynamic monitoring and control system for aquatic environments to substantially obviate one or more problems due to shortcomings of the traditional systems. Certain embodiments of this invention provide improved and extensive system anomaly analysis and predictive failure diagnostics coupled with remote monitoring and improved alert capabilities to regulate the aquatic environment and thus maximize the ecosystem stability.

The system and/or predictive failure analysis incorporated in certain embodiments uses data and/or sensor fusion technologies or algorithms to perform many functions including but not limited to monitoring, diagnosis, validation, verification, correction and adjustment of individual or collective control devices or parameters, to regulate the aquatic environment and thus maximize the ecosystem stability.

The system includes a plurality of sensors. Each of the sensors may measure a respective parameter of the aquatic environment or an associated control device, and produce a sensor output related to its measured parameter. The system also includes a processor (controller) that receives the sensor outputs and processes the data. When processing the data, the processor may use data or sensor fusion algorithms, to determine the status of the control device and/or the overall state of the aquatic environment, based on the sets of relationship between the measured parameters and the reference parameters.

Certain embodiments of the system may use the sensor data or output to perform real-time system analysis. In addition, the system may use the data to perform system anomaly analysis and predictive failure diagnostics.

Other embodiments of the invention include the system with associated sensors for system anomaly analysis and predictive failure diagnostics (i.e., controller) and the necessary control box for the requisite plumbing connections packaged together in a platform setting. This platform can be operably linked to any aqua system enclosure to form an aqua system. In other words, a user can connect the platform to an aqua system enclosure to attain the advantages of the present invention. Analogous to a personal computer platform, a user with the platform embodiment of this invention can connect other peripherals to the aqua system package. The platform embodiment of the invention may have additional modular spaces in the controller where the user can connect the sensor for the desired peripheral. Once connected to the platform, the peripheral can be monitored and controlled by the present invention, and thus attain the advantages of the invention. Examples of peripherals that can be connected to the platform embodiment include, a fish feeder, and/or a water replenishment package.

Other embodiments of the invention include improved and extensive, precise measurement and recordation of all relevant sensor data, real-time system anomaly analysis of recorded data, efficient adjustments of system parameters to compensate for any likely environment anomaly and predictive failure diagnostics based on the system anomaly analysis. Other embodiments of the invention also include efficient adjustment of the environment parameters to compensate for the dynamic aquatic environment conditions, presentation of system status and performance information at a local or a remote location, enabling remote monitoring of the aquatic environment for efficient service and maintenance and improved alert capabilities.

In accordance with one embodiment of the invention, the system provides improved and extensive, precise measurements and recordation of all relevant sensor output for real-time system anomaly analysis. The system analysis may include individual or collective performance of the component parts or machinery, such as the pumps, filters, using parameters such as current, vibration or acoustic data. Based on this real-time analysis of the integrated aqua system components, the system can evaluate the data for likely environment anomaly.

In yet another embodiment of the invention, the system provides predictive failure diagnostics based on the system anomaly analysis. The predictive failure diagnostics capability of the system may use the information from the real-time system anomaly analysis to predict what components might fail and prepare to adjust the aquatic environment component(s) accordingly to compensate for the impending failure.

In accordance with further embodiments of the invention, the system provides efficient adjustment of environment parameters to compensate for the dynamic conditions of the aquatic environment. Based on the improved and extensive measurements of the sensor data for the system analysis, the invention may adjust the individual aqua system components to maintain an energy efficient environment.

In yet another embodiment of the invention, the system may efficiently adjust the aqua system parameters to compensate for any likely system anomaly based on the real-time system anomaly analysis and the predictive failure diagnostics. Such novel preventive measures enable the system to be ready to adjust and quickly adjust, in the event of a likely failure of the potential control device, to maintain an efficient and cost effective aquatic environment.

In accordance with yet another embodiment of the invention, the monitoring and control system presents information on the aquatic environment's status and performance at a local or a remote location. This information may be presented in user-friendly format. In a specific embodiment, the capability to present information status and performance information graphically enables users or service personnel to create and manage schedules for routine maintenance. Such novel presentation of status or performance information, coupled with the user's experience, may also enable the users to predict unusual events or problems that may occur in the aquatic environment.

In accordance with yet another embodiment of the invention, the monitoring and control system may provide system analysis, predictive failure diagnostics and deliver predictive information on what mechanical components in the aquatic environment are likely to fail. Additionally, the invention may predict when the mechanical component is likely to fail. This predictive capability enables service personnel to be on notice for which component is likely to fail and to take corrective steps to prevent a detrimental result. Furthermore, because these aqua systems are on service contracts with routine maintenance schedules, the system's predictive ability to forecast unusual system events, such as events not covered by the scheduled maintenance, can be beneficial to the service contractors.

Other features and advantages of the present invention will become apparent to one of skill in the art upon review of the following drawings and the detailed description of the preferred embodiments.

BRIEF DESCRIPTION OF THE DRAWINGS

The present invention, as defined in the claims, can be better understood with reference to the following drawings. The drawings are not necessarily to scale, emphasis instead being placed on clearly illustrating principles of the present invention.

DETAILED DESCRIPTION

Definitions. As used in this description and the accompanying claims, the following terms shall have the meanings indicated, unless the context otherwise requires:

"Aqua system" or "aquatic environment" or "aquatic ecosystem", terms used interchangeably in this disclosure, refer to the complex of a community of aquatic organisms and its environment functioning as an ecological unit. The term may include, but is not limited to, a container (such as a glass tank) in which aquatic collections of living organisms are kept and/or exhibited.

The term "sensor fusion technology" as used herein refers to methods, algorithms, information fusion, and/or system architectures, by which data are combined from diverse sensors or devices to improve the probability of correct detection, classification, identification, decision making, information, and tracking. The term also includes data fusion, adaptive, heuristics and multi-sensor sensor technologies.

Also, in the following description the term "performing" may include activating, deploying, initiating, powering, and other terms known in the art that may describe the manner in which the system, including the processor, uses the sensor fusion technology or algorithms to produce one or more outputs.

Figure 1B:
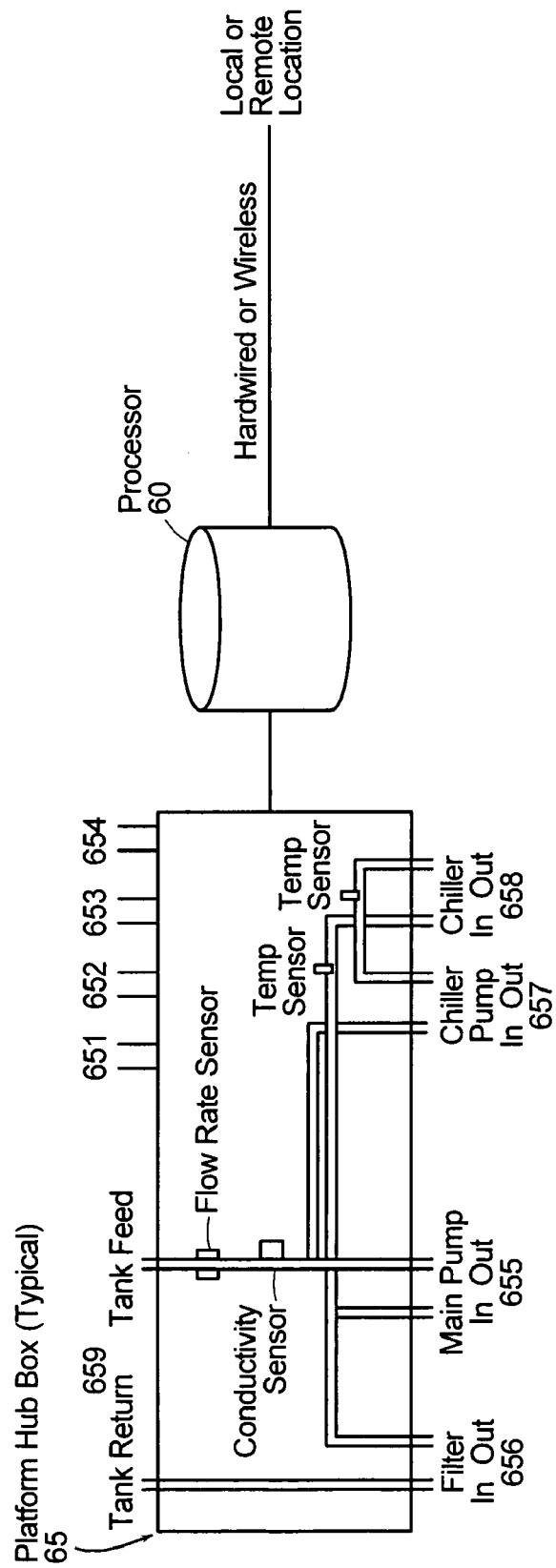
FIG. 1 is an overview of an embodiment of the system with the platform including the controller and the sensors.

With reference now to the figures wherein like reference numbers numerals designate corresponding parts throughout the several views, FIG. 1 illustrates an embodiment of the invention in the exemplary application for aqua systems. Although, the invention is described specifically in the context of dynamic monitoring and real-time control of aquatic environments, the invention is not limited to such applications. Those skilled in the art will appreciate that the present invention may have application to the monitoring and controlling of any automated and sophisticated aquatic environment.

FIG. 1 specifically shows an aqua system 10 with the processor 60 in accordance with the present invention. In this example, aqua system 10 can be divided into the enclosure 12 and the machinery 14. The machinery includes the plumbing and other related mechanical components or active components to provide and maintain the aquatic environment for the organisms in the enclosure. The mechanical or active components, such as the chillers, heaters, pumps, sensors, and control devices of the system, are elements that elements that effect at least a change in the aquatic environment. The mechanical or active components or control devices 40–55 may have sensors 401–551. Other parameters of the aquatic environment, that are not controlled by control devices, may also have sensors 561–591. A "parameter" of the aqua system 10 or control device 41 as used here includes any characteristic of the aqua system 10 or control device 41 that can be measured, recorded, detected or derived by calculation or other technique. More particularly, a measured, recorded or detected parameter includes any characteristic of the aqua system 10 or control device 41 (such as, acoustics, temperature, pressure, vibration, pH of the water, etc.). These parameters are examples and are not intended to be exclusive or limiting in any sense.

An aqua system sensor can be external or internal. An internal sensor 411 is a sensor directed or indirectly attached to a control device 41 or in the aquatic environment 10 to measure a parameter. Such an internal sensor includes a sensor, like a water temperature sensor 541, to determine the nature of the aquatic environment. An external sensor is a sensor proximate to but not in the aquatic environment. Such an external sensor is a sensor 561 to determine the nature of the surrounding environment, for example, the temperature of the area surrounding the aqua system. The sensor for the temperature of the room surrounding the aquarium is an example of an external sensor. Examples of sensors that may be employed in the system comprise sensors for measuring temperature, flow, acoustic, visual (including optical or motion), chemical properties, vibration, biological properties (such as biochips, pathogen detection), and pressure sensors. The above list of sensors is not met to be limiting.

A sensor 411, 561 produces data or at least an output that can be sent to the processor 60. The sensor 411, 561 may also receive an input or data from the processor 60 or the associated control devices. Sensor output or processor input and/or output may be telemetered by a communication means such as by hardwire 91 or by wireless means 92. For wireless means, the communicating devices may use RF frequencies, optical frequencies, IR frequencies, ultrasonic frequencies, magnetic effects, Bluetooth®, or the like, to communicate. When using a wireless means to transfer data, the communicating devices, in this instance the processor 60 and the sensor 411, 561 may use at least a unique identification code to substantially avoid interference from other electronic devices.

Typically, the processor 60 processes the sensor data. When processing the data, the processor may use data or sensor fusion technologies, to determine the status of the control device(s) 41 and/or the overall nature of the aquatic environment 10, based on the sets of relationship between the measured parameters and the reference parameters. In other words, the processor may use data or output, such as the sensor output or external output, to control at least an active component of the aquatic environment. Reference parameter refers to a measurement by the system during a period when the system determines that the environment is working correctly. Based on its analysis, the processor 60 may send an output to a sensor 411 to dynamically control the aqua system control devices 40–55 or a specific control device 42. Furthermore, the system can dynamically adjust conditions for the efficient control of the aquatic environment parameters based on the system analysis.

System Anomaly Analysis

Figure 2:
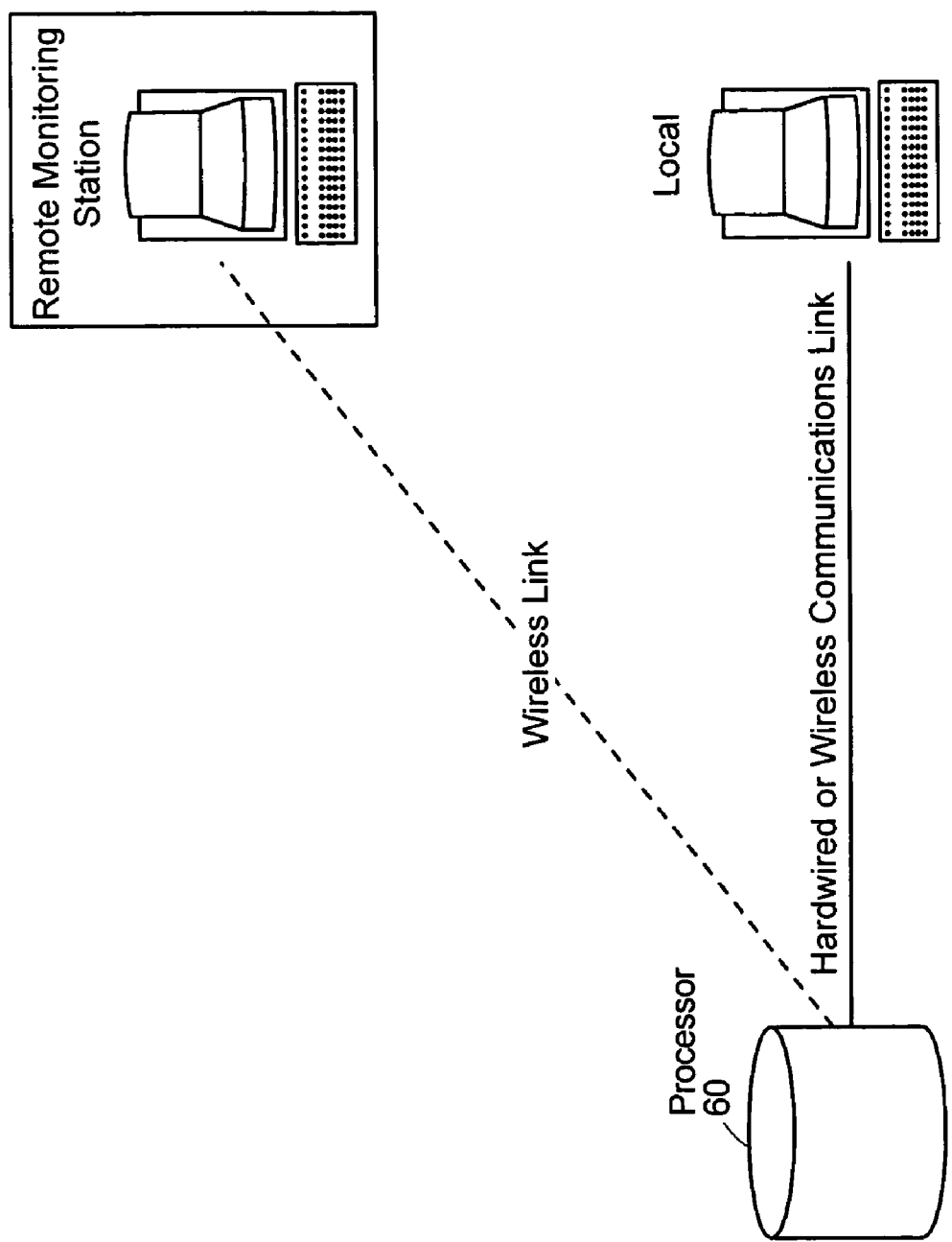
FIG. 2 also shows an aquarium with the system anomaly analysis and predictive failure diagnostics and the remote monitoring capability wherein the system can analysis for adjusting conditions for efficient control of parameters based on different system analysis.

In another embodiment, as shown in FIG. 2, the system may perform a system anomaly analysis based on the data or output from a sensor 411, 561. For a system anomaly analysis, the processor 60 may use data or sensor fusion technologies, to determine the status of the control device(s) 40–55 and/or the overall nature of the aquatic environment 10, based on the sets of relationship between the measured parameters and the reference parameters. In other words, the processor may use data or output, such as the sensor output or external output, to control at least an active component of the aquatic environment. In an embodiment, a reference parameter may be a threshold parameter. In this embodiment, the system may send an alert if the system determines a deviation from a reference threshold parameter. If the system does not receive an output from a control device sensor, the system may use redundant, backup or other sensors, to determine whether the control device has failed or otherwise (See Example 2, infra, illustrating a cost effective method of performing the system anomaly analysis, where the system could use a comparatively inexpensive temperature sensors instead of flow rate sensors 442, to determine deviations in water circulation in the aquatic environment). If the system determines that a control device or devices have failed, the system may send output to other control devices to compensate for the failed control device. In other words, the system may dynamically adjust conditions for the efficient control of parameters based on the system anomaly analysis. In addition, the system may send a signal or output to the local 70 or remote 80 monitoring station to alert it about the condition of the aquatic environment. The remote or local monitoring station may send back commands or outputs to regulate the aquatic environment and thus maximize the ecosystem stability and/or alert personal to address the alert. In other embodiments, the system may send a signal to service personnel to schedule maintenance or repairs for the failing or failed device. A local location refers to the immediate vicinity or area surrounding the aquatic environment. For example, if an aquarium is in a building, the local location may be the building with the aquatic environment. Comparatively, the remote location refers to any area or vicinity not part of the local location. In the above example, a remote location may be the off-site location of the aquarium servicing entity, which may be contracted to service the aquarium.

EXAMPLE 1

Monitoring the Chiller

In one example, sensors on the chiller and the chiller motor enable the system to monitor the performance of the chiller. Here the sensors can monitor parameters of the chiller, such as, the chiller operating temperature, the temperature of the chiller coil, the current used by the chiller, the vibration of the chiller, and the flow rate of water coming out of the chiller pump. If the system, using the sensor fusion technology, detects a failure or an impending failure based on a comparison of the recorded parameter with the reference and/or threshold parameter, the system can send an alert and take measures to minimize the aqua system temperature changes. Such measures may include regulating the lights to reduce the addition of heat while waiting for repair or maintenance. The monitoring scheme described above, although specifically described in relation to a chiller, is not limited to the chiller. A person of ordinary skill in the art will recognize that the monitoring scheme may be applicable to other components in the aquatic environment. The monitoring scheme may help monitor components such as, heater, pumps, filters, drain valves, as well as facilitate relatively complex procedures such as, detect the reduction of the opacity of the aqua system enclosure or reduction in the water quality.

Predictive Failure Diagnostics

In other embodiments, the system can also perform a predictive failure diagnostic based on the data from the sensors 401–591. For a predictive failure diagnostic, the processor 60 uses data or sensor fusion technologies to determine the status of the control device 40–55 and/or the overall nature of the aquatic environment 10, based on the sets of relationship between the measured parameters and the reference parameters. In other words, the processor may use data or output, such as the sensor output or external output, to control at least an active component of the aquatic environment. The processor 60 may compare the data for a control device 411 over a specified reference period to determine the overall performance of the control device 411. Using other sensor and/or data fusion algorithms, the processor may quantify deviations of the control device from its previous performance. One way of depicting and quantifying deviations is through a performance plot. In such an embodiment, the system plots a performance curve for the control device and it records any deviation from the optimal point. Depending on the magnitude of the deviation, the system determines the performance state of the control device.

Figure 3:
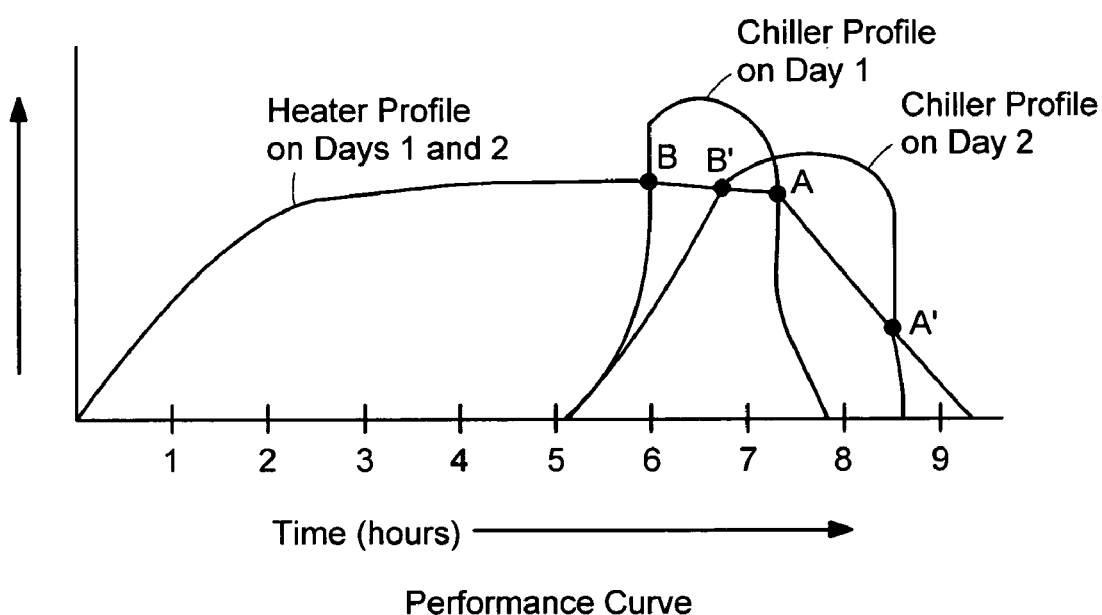
FIG. 3 shows an example of a Performance Curve that may be used in a predictive failure diagnostics.

FIG. 3 is an example of a simple performance plot for a control device illustrating a performance deviation. Here the system may compute the profile for at least a system control device or component such as the heater. In this example the system may compare the heater profile to the chiller profile. Points A and B are points where the profiles of both components normally intersect. Comparing profiles over different cycles, the system may determine whether the performance of a control device is deviant if the recorded intersections points for the control devices, A' and B' differ from the reference points A and B. In this example, the system may determine whether the control device's performance is optimal or nominal. Based on the specified threshold limits, the processor may send an output to the specific control device 41 via the associated sensor 411, to perform certain actions and thus dynamically compensate for the difference in performance or impending failure of the control device. In addition, the processor may send a signal to the local 70 or remote 80 monitoring location about the deviation in performance or impending control device failure as shown in FIG. 2. The monitoring personnel can then react accordingly or as described herein. Furthermore, the processor can dynamically adjust other related control devices to compensate for the impending failure of a control device. For example, based on the system analysis, if the system determines that a chiller's performance is marginal, the processor 60 may send a signal to the light sensor 511 to turn down the aqua system lights 51, thus, reduce the immediate temperature rise, in the event of a chiller failure. In sum, the system can dynamically adjust conditions for the efficient control of the aquatic environment parameters based on the predictive failure diagnostics.

EXAMPLE 2

A Cost Effective Method of Using Temperature Sensors, Instead of Flow Rate Sensors, to Assess the Circulation in an Aquatic Environment In this example, as illustrated in FIG. 2, a semi-industrial size aquarium 10 has a sophisticated aquarium control system. The control system uses a variety of sensors and actuators connected to a centralized or computer control system such as processor 60 to regulate the aquatic environment (heat, cooling, lighting, etc.) in a way that seeks to maximize ecosystem stability. A primary failure mode of the ecosystem is loss of water circulation through a chiller resulting in a rise in the temperature of the aquarium. The loss can be catastrophic, as in a pump motor failure, or can be gradual as in the slow clogging on an inline filter. In either case, when the lack of circulation reaches a critical state, it can be detected through a rise in the aquarium water temperature. Here, the control system may use a flow rate sensor 413 to detect both reductions in circulation and total loss of circulation.

Figures 2, 2A:
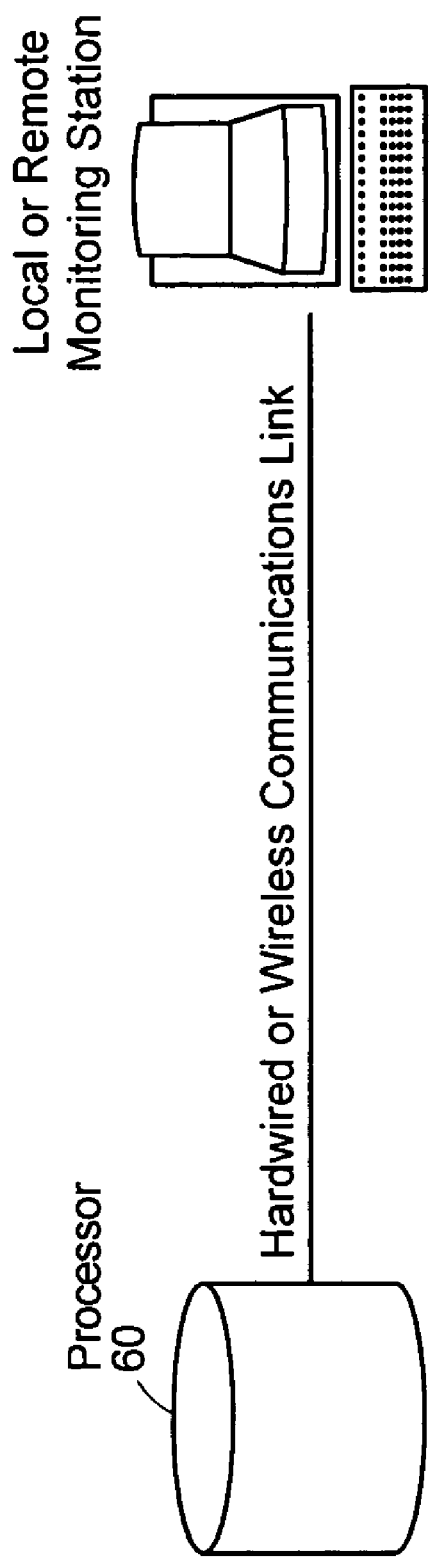
FIG. 2A shows an embodiment where the system using other sensors, such a temperature sensor instead of a flow rate sensor, to determine a non-corresponding parameter such a circulation.

Alternatively, in a system without flow rate sensors, as shown in FIG. 2A, the system may use at least two temperature sensors, the chiller temperature sensor 431 and the enclosure temperature sensor (tank temperature sensor) 541, to provide an improved means to detect reduction or loss of circulation. In this embodiment, the processor can analyze the output of the different aquarium temperatures in the period when the chiller is turned on and/or off. The control system compares the profile of the temperature changes during these periods at various points in the operation of the aquarium with reference profiles generated when the aquarium is known to be operating correctly. If the chiller is failing, and thus not chilling the water before circulation, the chiller sensor 421 or a temperature sensor 431 immediately downstream from the chiller, may have a different profile than the enclosure temperature sensor 541. The enclosure temperature sensor may also have a different profile because if the chiller pump is failing, the chilled water may not be reaching the enclosure. Furthermore, the enclosure lights may be contributing to the temperature increase of the enclosure water. In this instance, a deviation from a reference profile or changes in the temperature profiles may indicate an increased temperature gradient. A slow propagation of temperature changes around the system may also indicate changes. The system may monitor and analyze such profile deviation to detect reductions in circulation or the rate of circulation. This analysis may lead to the conclusion that the chiller or the chiller pump is failing and chilled water may not be reaching the enclosure at the nominal rate. Depending on the decided result, the system may take appropriate corrective and adaptive steps to stabilize the aquatic ecosystem.

In the above example, the system improves on the traditional systems in at least three instances: 1). Lowering costs by using existing temperature sensors in the system thus eliminating the need for a costly flow rate sensor; 2). Detecting likely system problems such as the failing chiller; and 3). Providing predictive failure analysis of the circulation and cooling systems.

Platform Embodiment

Figure 4B:
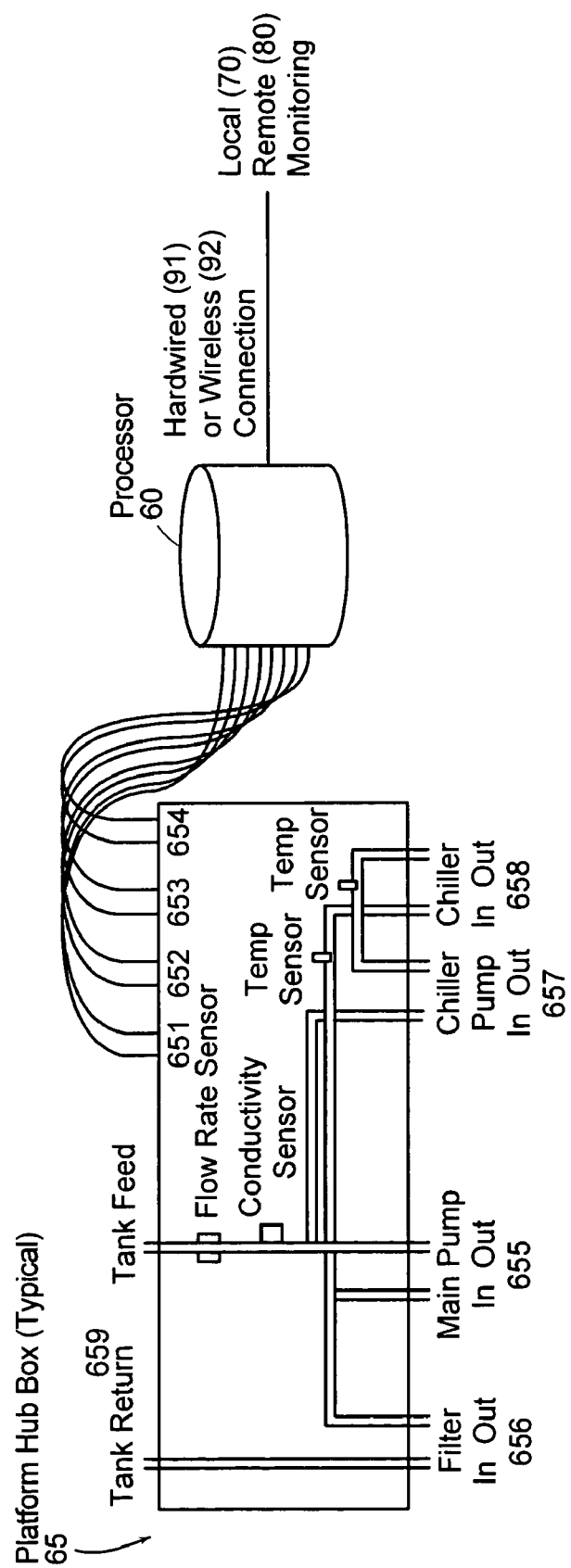
FIG. 4 shows the platform embodiment of the system with the processor and modules for adding peripherals.

FIG. 4 illustrates an aqua system 10 with the invention in the platform embodiment. In this example, the invention is packaged with the necessary plumbing or machinery in the platform setting. This embodiment is similar to the other embodiments with the control system, except, to accommodate the versatility of the system, a platform hub box 65 is connected to the processor 60. The platform hub box 65 may be a box with built-in sensor modules (with integrated sensors) or receptacles 651 for the sensors that could be part of an aquatic environment 10. The platform hub box 65 may also include the active components, such as the sensors, valves, control devices, and the core plumbing or machinery required to maintain an aquatic environment. In another embodiment, specific control devices such as the pumps, filters and the aquatic system enclosure can be coupled to the platform hub box. In this embodiment, the user may connect the aquarium plumbing or machinery to the platform hub box 65. Plumbing or machinery in this instance refers to items such as, pipes, pumps, heaters, lights, and other components that are required to operate and maintain the aquatic environment. For example, if a user has a basic aquarium, the user can connect her aquarium machinery, such as, the chiller pump, heater, main pump, and water valve to the corresponding sensor modules or receptacle 651–659 on the platform hub box 65. When in operation, a processor 60 linked to the platform hub box 65 can process the data or output from the coupled sensors or external output, to control at least an active component of the aquatic environment. In another example, a user with a more sophisticated and automated aquarium may connect other active components such as, a water replenishment system and a fish feeder, in addition to the other core machinery required to operate an aquarium, to the platform hub box 65. Similarly, the processor can determine the coupled active components or control devices and process the sensor data accordingly, to attain the numerous advantages of the invention.

In an aquarium embodiment with a water replenishment system module connected to the platform hub box, the system may automatically replenish the water periodically or as desired in the aquatic environment. In this embodiment, the system and processor may monitor and control the valves, filters and flow rate sensors or associated sensors to periodically remove some water from the aquarium and replace it with fresh filtered water.

In an embodiment of the invention, the receptacles on the platform hub box may have corresponding modules on the processor for operably linking the hub box to the processor. The processor may have additional modules to accommodate additional receptacles. The processor and the hub box may be operably linked by a communications means such as a hardwire link or a wireless means.

Furthermore, the processor 60 has a means for connecting the aquarium to a local 70 or remote 80 monitor to display the advantages of the system. The processor can connect to a local or remote monitor by a communication means as described supra such as a hard wire 91 link or by wireless 92 means, to display its output. The communication link between the processor and either a local and/or remote monitoring station may be two-way. In certain embodiments, the local or remote monitoring station may send commands to the processor. Furthermore, the processor and the local or remote communications link may use at least a unique identification code to substantially avoid interference from other electronic devices.

Examples of Aqua System Diagnostics

The following examples illustrate certain preferred embodiments and aspects of the invention and are not to be construed as limiting the scope thereof.

The following abbreviations apply in the examples:
$T_G$ (Ideal temperature goal); $T_{HZ}$ (High temperature beyond which aqua system inhabitants may perish); $T_{LZ}$ (Low temperature beyond which aqua system inhabitants may perish); $T_{HT}$ (High temperature beyond which chiller is activated or applicable component is activated); $T_{LT}$ (Low temperature beyond which heater or applicable component is activated); $T_C$ (nominal output temperature of chiller or applicable component); $T_H$ (nominal output temperature of heater or applicable component).

EXAMPLE 3

Predicting an Anomaly in the System and Sending an Alert

Figure 5:
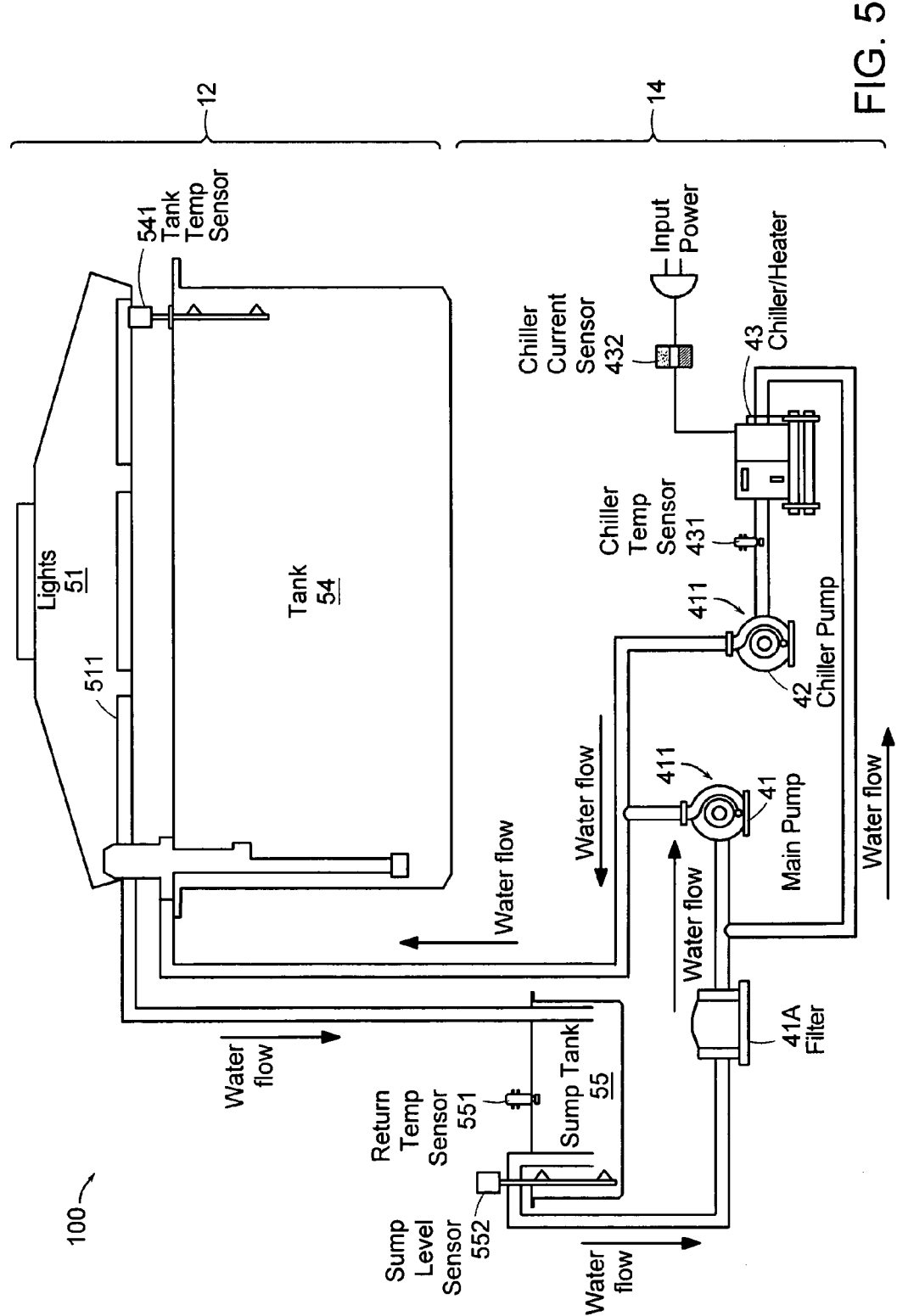
FIG. 5 shows an aquarium with a sump tank.
Figure 6:
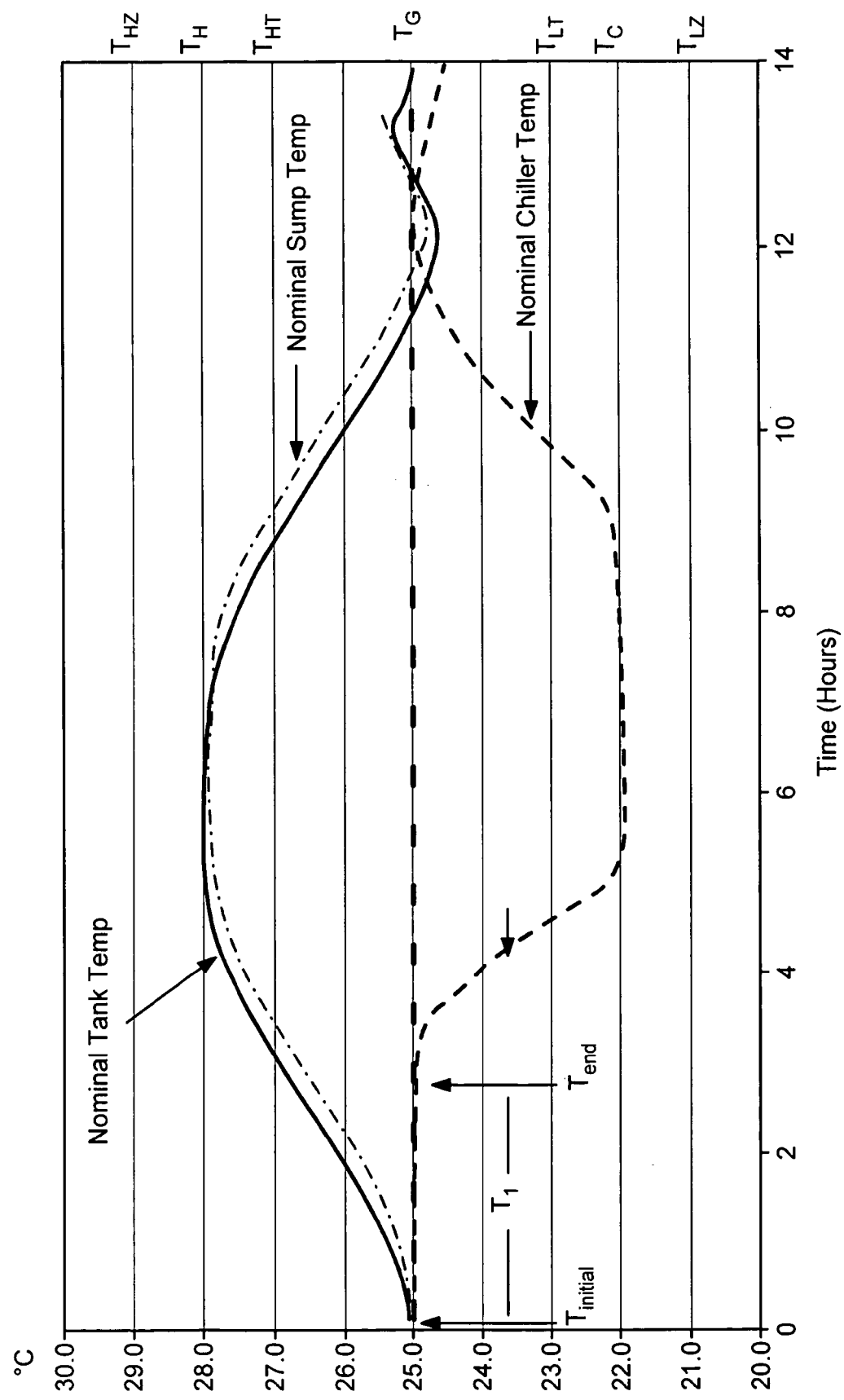
FIG. 6 is the graphical representation for the nominal tank and sump temperature profiles for an aqua system.

This example shows how the invention may predict an anomaly in an aqua system and. subsequently send out notification. FIG. 6 is a graphical representation of a typical temperature performance profile from an aqua system 100 shown in FIG. 5. Other profiles may be based on other parameters or a combination of parameters of the system. This embodiment of the aqua system includes a sump tank, the prerequisites components, such as pumps, filters, chillers, heaters etc., and associated sensors, such as temperature sensors, level sensors, flowrate sensors etc., for maintaining the aquatic environment.

Referring back to the graph of FIG. 6, the nominal tank temperature profile shows the temperature of the water in the tank. The nominal sump temperature shows the temperature of the water in the sump tank. Ideally and based on the circulation path in the aquatic environment, the sump temperature should track the tank temperature, as shown in FIG. 6. The sequence begins when the lights are turned on at time $T_{initial}$. As illustrated in FIG. 6, the tank water temperature may correspondingly start to rise due to the heat from the lights. The rising tank water temperature will deviate from $T_G$, the ideal temperature goal. Subsequently, the temperature of the sump water starts to rise as the tank water is circulated through the sump tank. The nominal sump temperature profile shows this corresponding temperature rise of the sump tank water. As the tank temperature reaches a certain reference temperature, $T_{HT}$, the system activates another component, such as the chiller, to keep the tank temperature within the threshold valve. The nominal chiller temperature is the reference operating temperature of the chiller. The system may have other sensors measuring the chiller core, which may have a different temperature profile compared to the chiller operating temperature. In another example where the ambient temperature may lower the tank water temperature, the system may activate another component such as the heater to keep the deviation of the tank temperature within threshold valve.

As shown in FIG. 6, the time interval between when the lights are turned on, $T_{initial}$, and when the chiller is activated, $T_{end}$, is represented by $T_1$. In this example, the circulating chilled water from the chiller may influence the tank and sump water temperatures. This influence may be a net downward effect on the rising tank water temperature. Based on the water circulation path shown in FIG. 5, as the tank temperature decreases, it follows that the sump water temperature should also decrease. Eventually, the tank and sump temperatures approach the $T_G$ and the chiller is deactivated. This rise of the tank water temperature with the consequential activation of the chiller, which induces a decline in the tank temperature, may be cyclical. FIG. 6 shows one period of such a cycle.

As described above, $T_1$ is the time interval representing when the chiller may be activated to help reduce the rising tank temperature. The system can measure $T_1$ over a number of cycles to determine the reference $T_1$. In an embodiment of the invention, wherein the time interval $T_1$ is repeatedly getting longer than expected over time but the tank and sump temperature profiles are normal, the system anomaly analysis and/or predictive failure diagnostics may determine that some tank lights are malfunctioning. In this example, wherein some of the lights are malfunctioning, the tank temperature may not rise as the same rate, thus, the chiller may be activated at a different time, $T_{end'}$. In this specific example, the $T_1$ interval will be longer over time. After the system determines such an anomaly, the system may send a non-critical alert. The term "non-critical alert", as used in this disclosure, refers to a situation that does not require instant attention, thus, a user can attend to the alert at the next scheduled maintenance visit. Here, the user may replace the malfunctioning lights at the next scheduled maintenance visit.

In a variation of the above example, where the lights are switched on and the tank and sump temperature profiles do not reach $T_{HT}$ but both lines track each other as expected, the system may conclude that all the lights are malfunctioning and send out an urgent alert. Referring back to the ideal profile in FIG. 6, turning on the lights should elicit the nominal tank and sump temperature profiles. However, if the lights are malfunctioning, the tank and corresponding sump temperatures may not rise. Subsequently, the chiller may not be activated to reduce the rise in temperature. Accordingly, $T_1$ may not be reached over a number of cycles. The system using the sensor and/or data fusion algorithms may conclude the lights are malfunctioning and thus send an urgent alert. The term "urgent alert" as used herein, refers to a situation that requires attention but a user does not have to attend to it instantly. In one example where an urgent alert is sent in the evening, the user can address the alert the following day.

EXAMPLE 4

Figure 7:
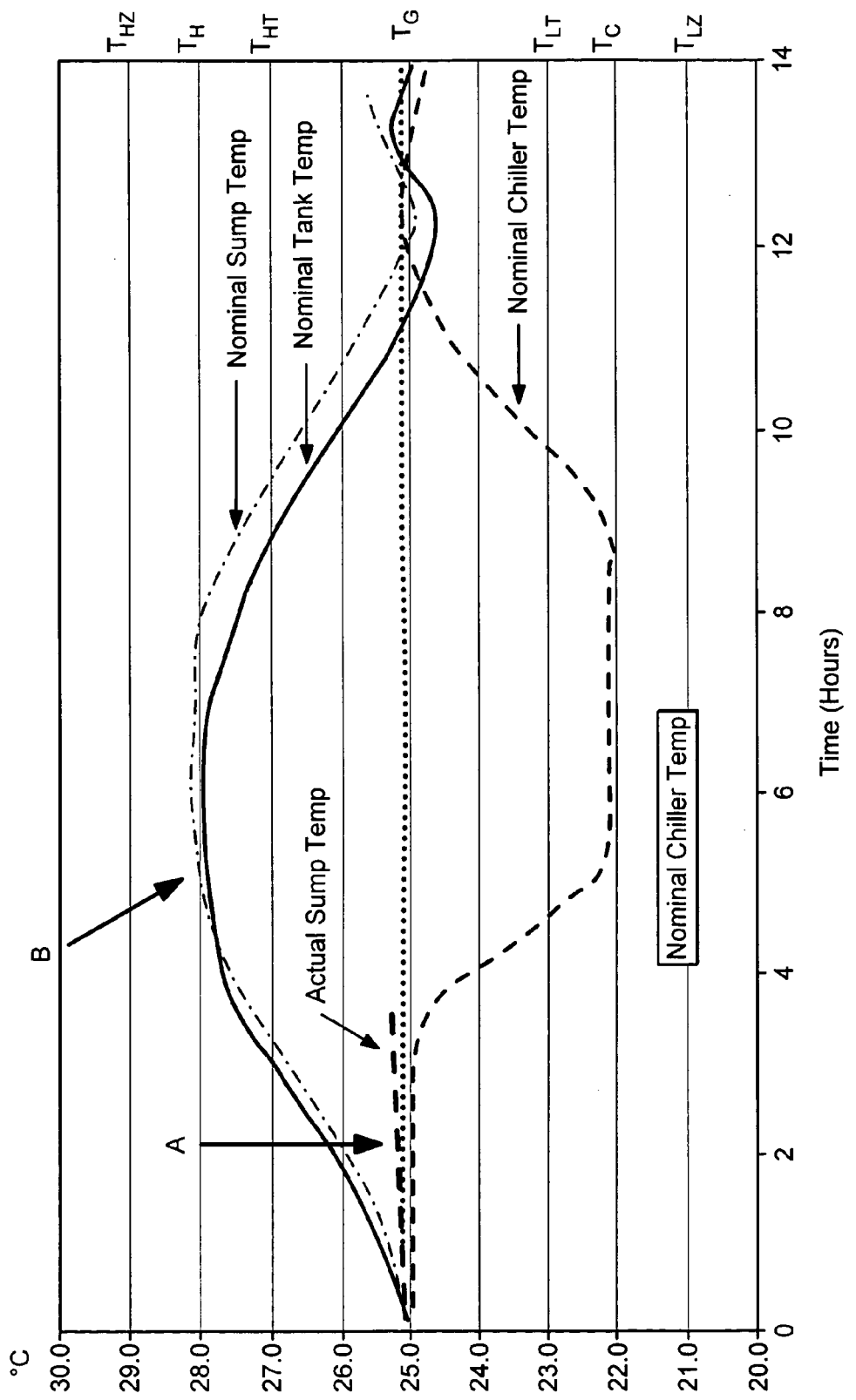
FIG. 7 is the graphical representation of the tank and sump temperatures during a potential chiller anomaly.

Detecting a Circulation Anomaly Based on the Deviation in at Least a Control Device and Optimizing the Aquatic Environment Accordingly FIG. 7 shows another example where the tank water temperature rises as expected when the lights are switched on, however, the sump temperature does not correspondingly rise with the tank temperature. In accordance with the invention as shown in FIG. 7, the system using the sensor fusion algorithms can detect this anomaly as soon as the sump temperature does not track the tank temperature. Using the system anomaly and predictive failure diagnostics, the system may conclude that the circulation is impeded because the tank water may not be circulating through the sump to affect the sump water temperature. Accordingly, the system can turn off the lights to minimize the temperature rise. Switching off the lights to mitigate the rise in temperature is an example of the corrective and/or adaptive measures the system can implement to stabilize the aquatic environment. After detecting the potential failure, the system may send out a critical alert. As used herein, the term "critical alert" indicates that a user should address the alert as soon as possible. Whereas the invention can detect this anomaly in a relatively short period labeled A on FIG. 7, the traditional systems may not detect this anomaly until the tank temperature has reached point B, or near the critical temperature $T_{HZ}$. If the tank temperature reaches $T_{HZ}$, there is a greater probability that the organisms in the aquatic system may perish.

EXAMPLE 5

Figure 8:
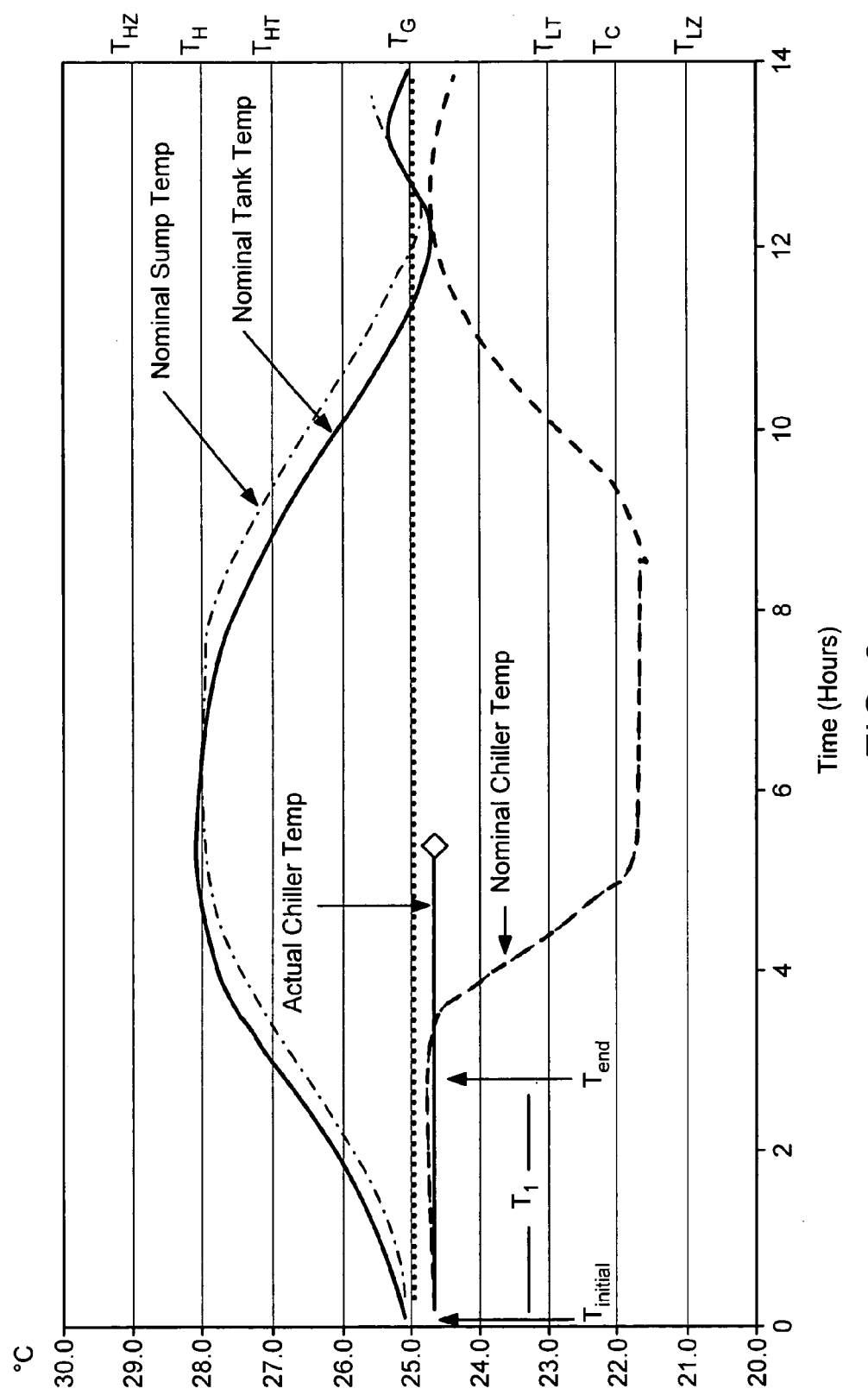
FIG. 8 is another graphical representation of the tank and sump temperatures during a potential anomaly.

Dynamic Monitoring and Control of the Aquatic Environment After a Component Failure FIG. 8 shows an example where the tank and sump temperatures rise as expected when the lights are switched on, however, the profile does not show the expected drop in chiller temperature and the chiller does not draw any current or energy. In accordance with the invention as shown in FIG. 8, the system using the sensor fusion algorithms can detect such anomalies and conclude that the chiller may be malfunctioning. In this example, when the chiller is not activated after time reference time interval $T_1$, the system may switch off the lights or take other steps, to minimize the temperature deviation. Switching off the lights to minimize the temperature rise is an example certain actions the system may employ to dynamically control the aquatic environment in anticipation of the failure or impending failure of the chiller or similar components. Furthermore, the system can send an urgent alert to local or remote monitoring stations about the malfunction. The system may continually monitor the malfunctioning component and dynamically adjust other components to compensate for deviations in the environment.

In a similar example as above, the chiller temperature still does not deviate from the nominal temperature, however, the chiller sensor indicates that the activated chiller is drawing current. In accordance with the invention, the system using the data and sensor fusion algorithms can detect such anomalies and conclude that the chiller may be malfunctioning. Similarly, in this example, when the temperature profile of the activated chiller does not seem to follow the nominal chiller profile after a specified time, the system may employ the dynamic adaptation system to induce certain actions, such as first switching off the lights to minimize the rise in temperature. Furthermore, the system can send an urgent alert to local or remote monitoring stations about the malfunction. Sequentially or concurrently, the system may attempt to troubleshoot the chiller using the associated component sensors or other sensors downstream from the affected component. Based on the sensor data, the system may conclude that the chiller lines may be frozen. Following this decision path, the system may wait for the chiller lines to thaw. After a specified time, the system can restart the chiller. If the chiller is activated and the chiller temperature profile is as expected, the system may conclude that the chiller has resumed normal operation and thus send an alert. Alternatively, if the chiller temperature profile is not as expected, the system may send out an alert about the malfunction and resume the dynamic adjustment of other components to efficiently control the aquatic environment.

EXAMPLE 6

Figure 9:
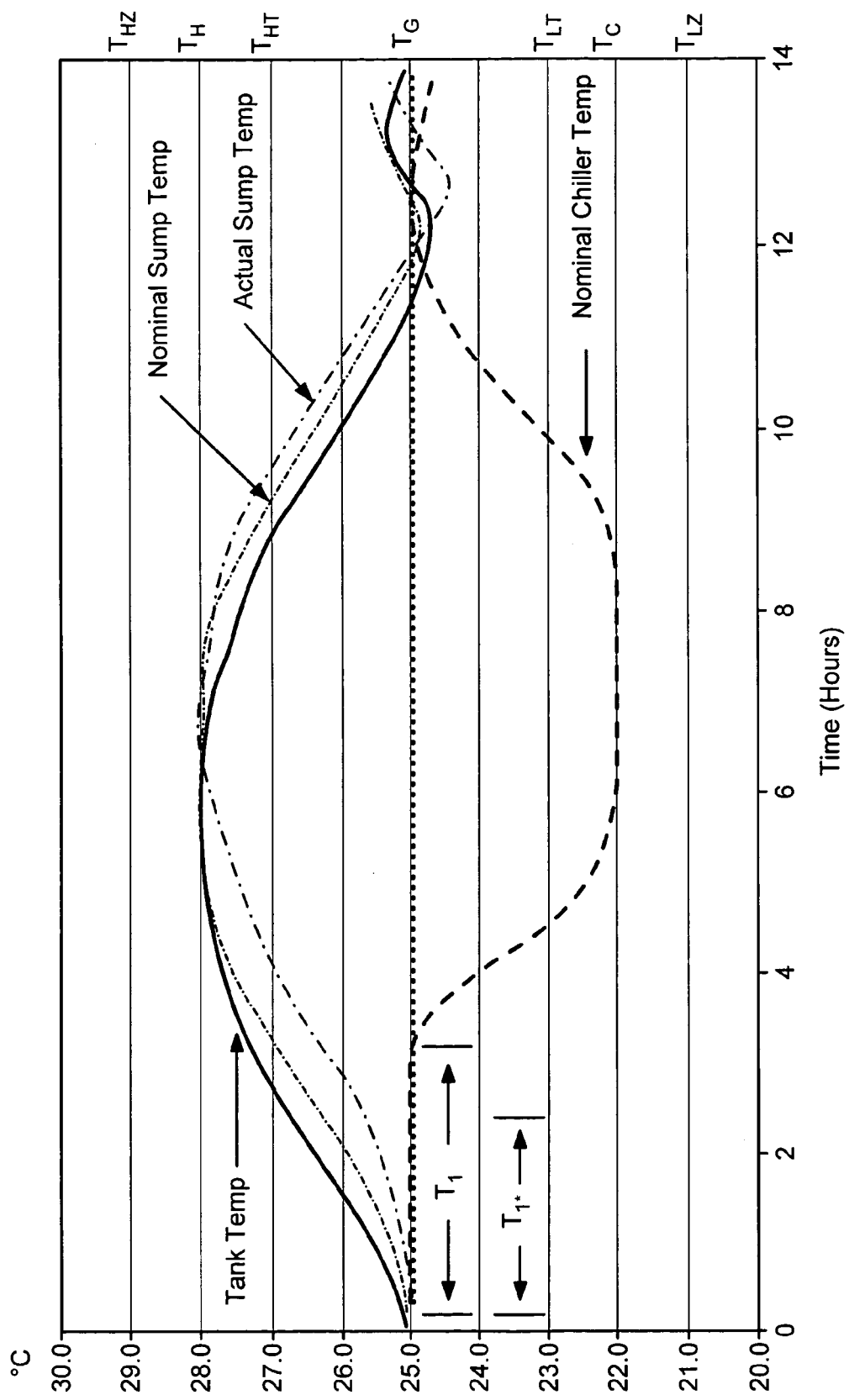
FIG. 9 is another graphical representation of the tank and sump temperatures during a potential anomaly.

Dynamic Monitoring and Control of the Aquatic Environment in Anticipation of an Impending Component Failure FIG. 9 shows another example where the tank and sump temperatures rise as expected when the lights are switched on, however, the sump temperature repeatedly lags the tank temperature by a larger margin than nominal (expected) over a number of cycles. In this example, the system may use the system anomaly analysis and predictive diagnostics to conclude that the chiller may not be functioning at the nominal level and send an urgent alert. More specifically, using the data and sensor fusion algorithms, the system may determine that circulation is subnominal due to an anomaly such as a clogged filter or pump wear. Consequently, employing the dynamic adaptation heuristics algorithms, the system may decrease the $T_{HT}$ such that, first, the system can tolerate the effects of a slower circulation of the chiller water and the chiller may be activated after a relatively shorter time interval, $T_{1*}$, thus the actual chiller profile may approximate the expected chiller profile. Additionally, the system may back flush and/or flip the filters if flip filters are in use.

The basic concepts of the present invention may be embodied in many ways. The present invention includes analysis techniques as well as the devices to accomplish the appropriate analysis. The discussion included in this application is intended to serve as a basic description. It should be understood that a variety of changes may be made without departing from the essence of the invention, and that such changes are also implicitly included in the description and within the scope of this invention as claimed.

We claim:

1. A method for dynamically monitoring, controlling and optimizing an aquatic environment using an aquatic environment control system, said method comprising:

monitoring an aquatic environment, the step of monitoring comprising:
recording data from at least one of a system control device and an associated sensor,
storing the data, and
making the data available for analysis;
performing a system anomaly analysis on the data; and
controlling the aquatic environment, the step of controlling further comprising:
presenting an output from the system anomaly analysis at a location using a communication means; and
regulating the system control device based on the output from the system anomaly analysis.

2. The method of claim 1, wherein the output is presented at a remote location.

3. The method of claim 2, wherein the output includes an alert if the system anomaly analysis determines a deviation from at least a reference threshold parameter.

4. The method of claim 1, wherein the system uses other sensors to monitor and control a parameter not associated with a first sensor in the aquatic environment.

5. The method of claim 4, wherein the system the aquatic environment control system uses at least a temperature sensor to measure deviations in circulation in the aquatic environment.

6. The method of claim 4, wherein the method further comprises responding to the output presented wherein the system the aquatic environment control system creates or manages schedules for routine maintenance based on the system anomaly analysis.

7. The method of claim 5, wherein the process further comprises compensating for performance deviations in the aquatic environment, by adjusting at least a first system control device to eliminate potential deviations in performance.

8. The method of claim 5, wherein the method further comprises compensating for performance deviations in the aquatic environment, by adjusting other system control devices to eliminate other potential deviations in performance.

9. A method for monitoring, controlling and optimizing an aquatic environment using an aquatic environment control system, said process comprising:

monitoring an aquatic environment, the step of monitoring comprising:
recording the data from at least a system control device and an associated sensor,
storing the data, and
making the data available for analysis;
performing predictive failure diagnostics based on the data, the step of performing further comprising:
delivering an output from the predictive failure diagnostics, wherein the output includes a prediction of failure of a system control device; and
controlling the aquatic environment, the step of controlling further comprising:
presenting the output from the predictive failure diagnostics at a location using a communication means; and
regulating the at least system control device based on the output from the predictive failure diagnostics.

10. The method of claim 9, wherein the output is presented at a remote location.

11. The method of claim 9, further comprising predicting at least an unusual system event not covered by scheduled maintenance,
 wherein the aquatic environment control system creates or manages schedules for routine maintenance based on the predictive failure diagnostics.

12. The method of claim 9, further comprising predicting at least a system event not covered by scheduled maintenance,
 wherein the aquatic environment control system creates or manages schedules for routine maintenance based on the predictive failure diagnostics.

* * * * *